R. HAMILTON.
CULTIVATING HARROWS.
No. 184,150. Patented Nov. 7, 1876.
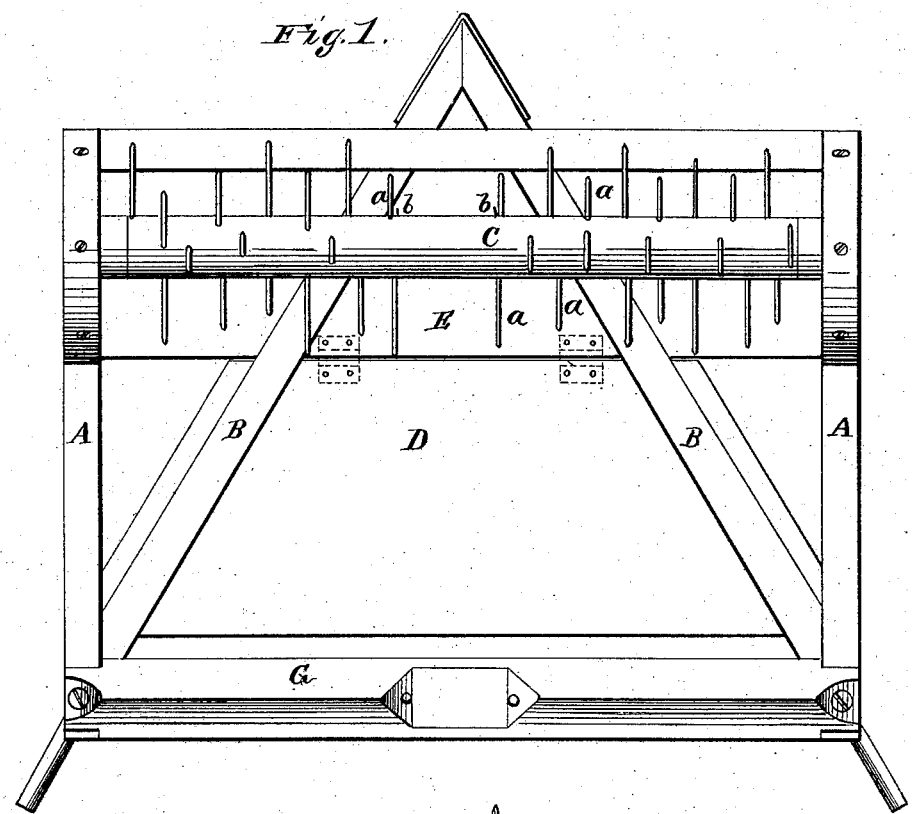
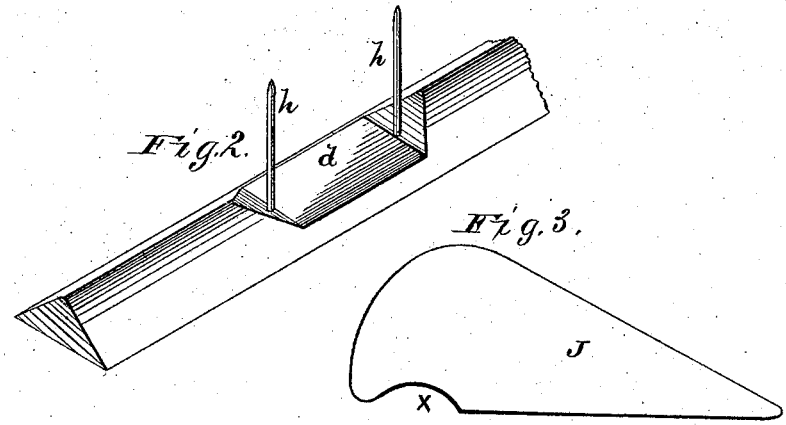

UNITED STATES PATENT OFFICE.

ROBERT HAMILTON, OF FRANKLIN, INDIANA.

IMPROVEMENT IN CULTIVATING-HARROWS.

Specification forming part of Letters Patent No. 184,150, dated November 7, 1876; application filed October 11, 1876.

*To all whom it may concern:*

Be it known that I, ROBERT HAMILTON, of Franklin, in the county of Johnson and in the State of Indiana, have invented certain new and useful Improvements in Cultivating-Harrows; and do hereby declare that the following is a full, clear, and exact description thereof, reference being had to the accompanying drawings, and to the letters of reference marked thereon, making a part of this specification.

My invention relates to an improvement on the earth-pulverizer for which Letters Patent, No. 179,553, were granted to me July 4, 1876; and it consists in adapting the pulverizer for use as a cultivator or corn-harrow, as will be hereinafter more fully set forth.

In order to enable others skilled in the art to which my invention appertains to make and use the same, I will now proceed to describe its construction and operation, referring to the annexed drawing, in which—

Figure 1 is a bottom view of my cultivator or corn-harrow. Fig. 2 is a view of a detached part thereof, and Fig. 3 shows a runner used with the same.

A represents the rectangular frame with V-shaped tongue B, shaft or roller C, with harrow-teeth $a\, a$, and the triangular bar G connected to the rear of the frame. On top of the tongue B is secured the board or platform D, to the front edge of which I have hinged a lid, E, to protect the operator from the harrow-teeth. The harrow-teeth $a\, a$ are set in spiral form from the center toward both ends, whereby the pulverizer is made to run straight and not incline to either side.

To adapt my pulverizer, as described in my former patent above referred to, for use as a cultivator or corn-harrow, it will be seen that I first dispense with the pulverizing-bars, having the alternate V-shaped depressions and projections; second, in the center of the shaft or roller C, a number of teeth are removed, leaving an open central space, $b\, b$, in the revolving harrow; third, in the center of the triangular bar G, in the under or lower edge, is made a depression, $d$, with a tooth, $h$, projecting vertically downward from each end thereof.

By these means I am enabled to cultivate the corn when small with the same machine.

J represents a runner having a concavity, $x$, in its upper edge. This runner is placed under the shaft C, the shaft resting in said concavity and one of the teeth $a$ passing through a hole in the runner, whereby a sled is formed to haul the harrow to and from the field.

Having thus fully described my invention, what I claim as new, and desire to secure by Letters Patent, is—

1. The combination of the frame A, the roller C, with teeth $a\, a$ arranged spirally from each end of the central space $b\, b$, to the ends of the roller, and the rear triangular bar G, with depression $d$ and teeth $h\, h$, substantially as and for the purposes set forth.

2. The detachable runner J with concavity $x$, in combination with the toothed roller C, for the purposes herein set forth.

In testimony that I claim the foregoing I have hereunto set set my hand this 22d day of September, 1876.

ROBERT HAMILTON.

Witnesses:
SAMUEL A. WILSON,
CHRISTIAN STEAT.